United States Patent
Mesnil et al.

(10) Patent No.: US 12,281,967 B2
(45) Date of Patent: Apr. 22, 2025

(54) METHOD FOR DETECTING A DEFECT IN A STRUCTURE OF A DEVICE

(71) Applicant: Commissariat A L'Energie Atomique et aux Energies Alternatives, Paris (FR)

(72) Inventors: Olivier Mesnil, Gif-sur-Yvette (FR); Guillemette Ribay, Gif-sur-Yvette (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 315 days.

(21) Appl. No.: 17/899,804

(22) Filed: Aug. 31, 2022

(65) Prior Publication Data

US 2023/0070346 A1    Mar. 9, 2023

(30) Foreign Application Priority Data

Sep. 8, 2021 (FR) ...................................... 21 09417

(51) Int. Cl.
 G01M 5/00    (2006.01)
(52) U.S. Cl.
 CPC ........ G01M 5/0066 (2013.01); G01M 5/0033 (2013.01)
(58) Field of Classification Search
 CPC ........................... G01M 5/0066; G01M 5/0033
 See application file for complete search history.

(56) References Cited

U.S. PATENT DOCUMENTS 6,124,926 A * 9/2000 Ogawa ............... G01N 21/9501
 356/417
6,996,480 B2   2/2006 Giurgiutiu et al.
 (Continued)

FOREIGN PATENT DOCUMENTS

CA    2650832 A1 * 11/2007 ............. G01H 11/08
CN    102226783 A    10/2011
 (Continued)

OTHER PUBLICATIONS

French Preliminary Search Report issued May 11, 2022 in French Application 21 09417 filed on Sep. 8, 2021, 12 pages (with English Translation of Categories of Cited Documents & Written Opinion).
 (Continued)

*Primary Examiner* — Elias Desta
(74) *Attorney, Agent, or Firm* — Oblon, McClelland, Maier & Neustadt, L.L.P.

(57) ABSTRACT

A method for detecting a defect in a structure of a device includes generating, only using the device, a low-frequency signal that makes the structure vibrate, generating a high-frequency signal in the structure, and measuring a vibratory signal caused by the generated low-frequency and high-frequency signals at the same time then adaptively re-sampling these measurements to obtain a re-sampled vibratory signal the power spectrum. The resampling includes a first frequency range $[u_{BFmin}; u_{BFmax}]$ of width larger than 5 Hz that contains 95% of the power of the low-frequency signal, a second frequency range $[u_{HFmin}; u_{HFmax}]$ of width systematically smaller than $u_{BFmin}$ that contains 95% of the power of the low-frequency signal. A defect is signaled in the structure if an additional power lobe is detected outside of the ranges $[u_{BFmin}; u_{BFmax}]$ and $[u_{HFmin}; u_{HFmax}]$.

12 Claims, 3 Drawing Sheets

(56) References Cited

U.S. PATENT DOCUMENTS

| | | |
|---|---|---|
| 10,191,013 B2 | 1/2019 | Tansel et al. |
| 10,324,026 B2 | 6/2019 | Chapuis |
| 2021/0080430 A1 | 3/2021 | Mesnil |
| 2021/0156759 A1 | 5/2021 | Donskoy et al. |

FOREIGN PATENT DOCUMENTS

| | | | | |
|---|---|---|---|---|
| FR | 2937953 A1 | * | 5/2010 | .......... G01M 5/0033 |
| FR | 3 014 200 A1 | | 6/2015 | |
| FR | 3 075 373 A1 | | 6/2019 | |
| FR | 3 105 554 A1 | | 6/2021 | |

OTHER PUBLICATIONS

Lee et al., "Identification of fatigue crack under vibration by nonlinear guided waves", Mechanical Systems and Signal Processing 163, 2021, 15 pages.

Ochoa et al., "Effects of high-amplitude low-frequency structural vibrations and machinery sound waves on ultrasonic guide wave propagation for health monitoring of composite aircraft primary structures", Journal of Sound and Vibration 475, 2020, 21 pages.

Dziedziech et al., "Efficient swept sine chirp excitation in the non-linear vibro-acoustic wave modulation technique used for damage detection", Structural Health Monitoring, vol. 17(3), 2017, 12 pages.

Kou et al., "Dynamic and fatigue compressor blade characteristics during fluid-structure interaction: Part I-Blade modelling and vibration analysis", Engineering Failure Analysis 76, 2017, 19 pages.

Fabry et al., "Aircraft Gas Turbine Engine Vibration Diagnostic", Magazine of Aviation Development 5(4), 2017, 5 pages.

Song et al., "Coded excitation for ultrasound tissue harmonic imaging", Ultrasonics 50, 2010, 7 pages.

Kim et al., "Crack Detection On Wind Turbine Blades in an Operating Environment Using Vibro-Acoustic Modulation Technique", AIP Conf. Proc. 1511, 2013, 8 pages.

Guidorzi et al., "Impulse responses measured with MLS or Swept-Sine signals applied to architectural acoustics: an in-depth analysis of the two methods and some case studies of measurements inside theaters", Energy Procedia 78, 2015, 6 pages.

Feng et al., "Recent advances in time-frequency analysis methods for machinery fault diagnosis: A review with application examples", Mechanical Systems and Signal Processing 38, 2013, 41 pages.

\* cited by examiner

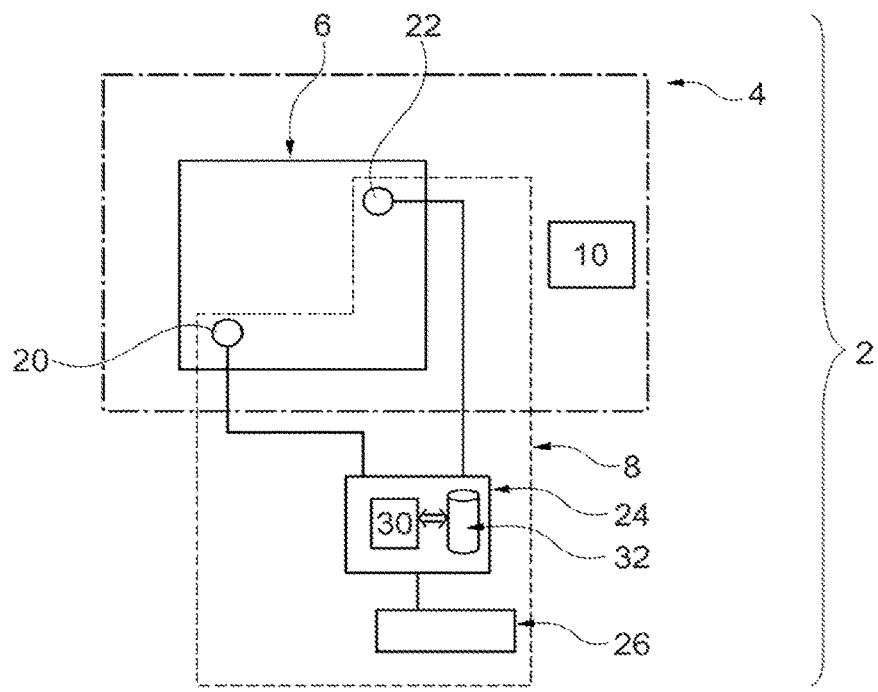
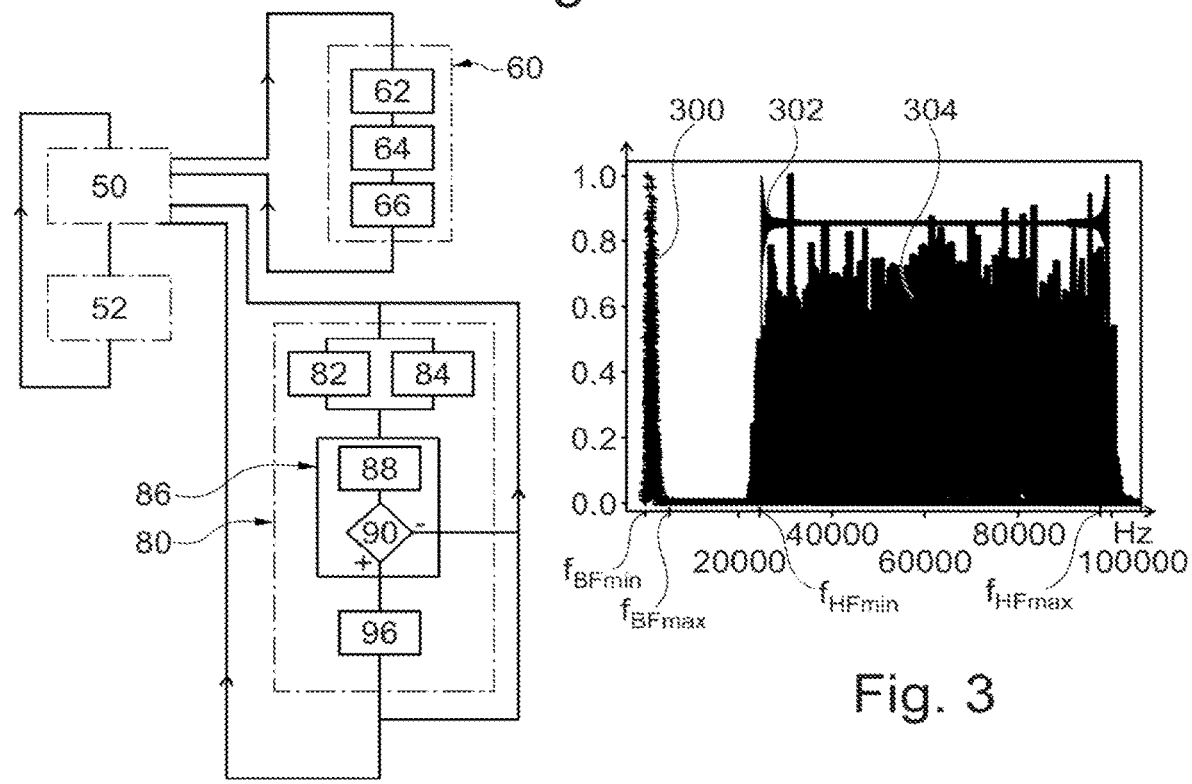
Fig. 1
Fig. 2
Fig. 3

METHOD FOR DETECTING A DEFECT IN A STRUCTURE OF A DEVICE

The invention relates to a method for detecting a defect in a structure of a device. The invention also relates to a system for implementing this detecting method.

The invention is in particular, but not exclusively, applicable to the field of non-destructive testing and to structural health monitoring.

Known methods for detecting defects exploit non-linear interactions between a defect in the structure and a high-frequency signal that appear in the presence of a low-frequency signal. Such non-linear interactions are conventionally called vibro-acoustic modulations (vibro-acoustic modulation is also known by its acronym VAM). These methods allow contact defects, i.e. defects that in the absence of exterior stresses remain in a closed state, to be detected. In the closed state, the volume of the defect is minimal. For example, when the defect corresponds to a crack, in the closed state, the facing walls of this crack touch over at least some or even all of their length. Such contact defects are often precursors to defects that get worse over time. Contact defects are difficult to detect exactly because, in the closed state, they do not necessarily correspond to an open crack able to more easily interact with waves propagating through the structure.

The low-frequency signal allows a contact defect to be periodically displaced between its closed state and its open state. In the open state, the volume of the defect is larger. For example, when the defect is a crack, the facing walls of this crack are further away from each other than in the closed state.

In the open state, the interactions of the defect with the high-frequency signal are different from the interactions of the high-frequency signal with the defect in its closed state. Thus, another advantage of vibro-acoustic modulation is that it does not require a reference measurement to be carried out on the structure in the absence of any defects, to be capable of detecting the appearance of such a defect.

Lastly, vibro-acoustic modulation uses a high-frequency signal the frequency of which is generally higher than 10 kHz or than 20 kHz. By virtue thereof, it is possible to detect very small defects, for example micron-sized defects that are not necessarily detectable using other methods.

In known methods, to implement vibro-acoustic modulation, the following are required:
- a low-frequency emitter that generates the low-frequency signal,
- a high-frequency emitter that generates the high-frequency signal,
- a sensor that measures the vibratory signal caused by the generated low-frequency and high-frequency signals at the same time in the structure, and
- a computer that processes the measurements of the vibratory signal.

More precisely, the computer implements signal-processing algorithms that make it possible to detect the presence, in a power spectrum of the vibratory signal, of an additional power lobe located outside of the power ranges in which the power of the low-frequency and high-frequency signals are concentrated. In order to be capable of detecting the existence of such an additional power lobe in the power spectrum, the signal-processing algorithms require a low-frequency emitter and a high-frequency emitter to be employed, these generating low-frequency and high-frequency signals having particular characteristics. It is these particular characteristics that then allow an additional lobe to be detected when the latter is present in the power spectrum.

Examples of such known methods are described in the following documents:
US2021/156759A1,
Lee YU FUNG et al.: "Identification of fatigue crack under vibration by nonlinear guided waves", Mechanical Systems and Signal Processing, Elsevier, Amsterdam, NL, vol. 163, 17/06/2021.

In particular, the above two documents mention that it is possible to use the natural vibrations of the structure during its use as low-frequency signal for the vibro-acoustic modulation.

Other methods also use a low-frequency signal and a high-frequency signal to detect defects in a structure without it however being a question of vibro-acoustic modulation. For example, such a method is described in the following article: OCHOA PEDRO A et al.: "Effects of high-amplitude low-frequency structural vibration and machinery sound waves on ultrasonic guided wave propagation for health monitoring of composite aircraft primary structures", Journal of Sound and Vibration, Elsevier, Amsterdam, NL, vol. 475, 28 Feb. 2020. This article does not concern vibro-acoustic modulation, because the duration of the high-frequency signal is much shorter than one period of the low-frequency signal. Under these conditions, no non-linearity is observed or observable in the power spectrum in the case of presence of a defect in the structure.

Another method for detecting defects by vibro-acoustic modulation is disclosed in the following article: Dziedziech et al.: "Efficient swept sine chirp excitation in the non-linear vibro-acoustic wave modulation technique used for damage detection", Structural Health Monitoring, 2018, volume 17 (3), pages 565-576. Below, this article is designated by the reference A1.

In the method of A1, for it to be possible to detect the existence of an additional power lobe in the power spectrum of the vibratory signal, the following two conditions must be met:
i) the generated low-frequency and high-frequency signals must systematically be in phase, and
ii) the degree of variation in the frequency of the low-frequency signal must be identical to the degree of variation in the frequency of the high-frequency signal.

In the method of A1, condition ii) is met by requiring the ratio between the instantaneous frequency of the low-frequency signal and the instantaneous frequency of the high-frequency signal to always remain constant. In the method of A1, this ratio is equal to $1/120$.

To meet conditions i) and ii), it is therefore necessary to equip the structure both with a low-frequency emitter dedicated to generating the desired low-frequency signal and with a high-frequency emitter dedicated to generating the desired high-frequency signal.

In addition, it is also necessary for the low-frequency and high-frequency signals to be emitted in the absence of noise liable to interfere, notably, with the low-frequency signal.

Thus, notably in an industrial environment, known methods that use vibro-acoustic modulation to detect the presence of a defect remain quite complex to implement, notably because they require two different types of emitter, namely the low-frequency emitter and the high-frequency emitter, to be integrated into the structure. In addition, these methods cannot be implemented at the same time as the device that the structure is integrated into is used. Specifically, use of such a device in an industrial environment results in the presence of a substantial amount of noise, notably at low frequencies, which interfere with the low-frequency signal generated by the low-frequency emitter.

The invention aims to provide a defect-detecting method that uses vibro-acoustic modulation while being simpler to implement.

Another subject of the invention is a system for implementing this detecting method.

The invention will be better understood on reading the following description, which is given solely by way of non-limiting example, with reference to the drawings, in which:

FIG. 1 is a schematic illustrating a system allowing a defect in a structure to be detected;

FIG. 2 is a flowchart of one method for detecting a defect capable of being implemented in the system of FIG. 1;

FIGS. 3 to 6 are graphs illustrating power spectra of signals generated during the implementation of the method of FIG. 2;

Figure 4:
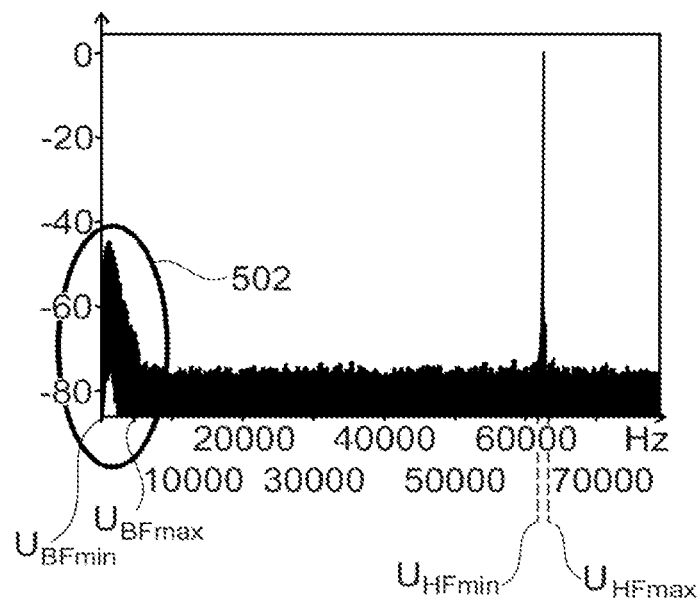

Hereinafter in this description, features and functions that are well known to those skilled in the art are not described in detail.

In this description, detailed examples of embodiments are first described in section I with reference to the figures. Next, in Section II, variants of these embodiments are presented. Lastly, the advantages of the various embodiments are presented in Section III.

SECTION I: EXAMPLES OF EMBODIMENT

FIG. 1 shows a system 2 that comprises:
a device 4 equipped with a structure 6, and
an apparatus 8 for detecting a defect in the structure 6.

The structure 6 is a mechanical part of the device 4. Below, this first embodiment is described in the particular case where the structure 6 is a thin structure. For example, here, the thin structure 6 has an external face and an internal face that are separated from each other by the thickness $e_6$ of the thin structure 6. The thickness $e_6$ is sufficiently small for the external and internal faces to guide the propagation of an elastic wave or of a Lamb wave through the thin structure in directions parallel to these external and internal faces. To this end, typically, the thickness $e_6$ is ten or one-hundred times smaller than a length and/or a width of the thin structure 6.

Usually, the thickness $e_6$ is smaller than $1.51\lambda_v$, where $\lambda_v$ is the wavelength of a volume wave of frequency $f_{HFmin}$ that is able to propagate parallel to the external face of the thin structure 6. The frequency $f_{HFmin}$ is defined below.

By way of illustration, here, the thin structure 6 is a composite panel of the fuselage of an airplane. In this case, the device 4 is the airplane that contains this composite panel.

The thin structure 6 is made of laminated composite materials, i.e. of a stack, in a direction perpendicular to the external face, of a succession of layers that each is made of one respective material. As explained in Section II on the variants, the teaching given in this particular case is transposable without particular difficulty to many other possible structures.

To simplify FIG. 1, the thin structure 6 has been represented by a single rectangle. However, in fact, the shape of the thin structure 6 is more complex. In particular, in the particular case of a composite fuselage panel, the thin structure 6 typically has rounded curves.

In the case where the device 4 is an airplane, the device 4 typically comprises at least one propulsion engine 10 that, for example, drives the blades of a turbine to rotate with a view to moving the airplane and making it fly. Thus, in this embodiment, normal use of the device 4 consists in driving this turbine to rotate using the engine 10.

Conventionally, normal use of the device 4 generates a low-frequency signal that makes the thin structure 6 vibrate at low-frequency. A use of the device 4 that is not solely meant to detect a defect in the thin structure 6 is a "normal" use. Thus, here, the normal use of the device 4 consists in driving the blades of the turbine at a speed this allows the airplane to be propelled along a path. In this text, "low-frequency" designates frequencies comprised between 5 Hz and 20 kHz.

The device 4 is such that 95% of the power of the low-frequency signal is comprised in a frequency band $[f_{BFmin}, f_{BFmax}]$ when the device 4 is used in the absence of a high-frequency signal generated by the apparatus 8. In other words, the power spectrum of the low-frequency signal constructed from samples of a measurement of the vibrations of the thin structure 6 when the device 4 is being used, and in the absence of the high-frequency signal generated by the apparatus 8, has a power lobe, which represents 95% of the total power measured over the entire extent of the constructed power spectrum, that extends from 5 Hz to 20 kHz. This power lobe starts at the frequency $f_{BFmin}$ and ends at the frequency $f_{BFmax}$. This power spectrum is constructed by applying a Fourier transform to samples of the measurement of the vibrations acquired at a constant sampling frequency $f_e$. This frequency $f_e$ is higher than 40 kHz and, here, also two times higher than the frequency $f_{HFmax}$. The frequency $f_{HFmax}$ is described below.

Here, the device 4 generates a low-frequency signal when it is used, for which:
the frequency $f_{BFmin}$ is higher than 5 Hz and, preferably, higher than 100 Hz, and
the frequency $f_{BFmax}$ is lower than 20 kHz or than 5 kHz.

For example, it has been observed experimentally that vibrations in the structure 6 that appear when the engine 10 is driving the turbine to rotate to propel the airplane are comprised between 100 Hz and 2 kHz.

The frequencies $f_{BFmin}$ and $f_{BFmax}$ are different. The width of the band $[f_{BFmin}; f_{BFmax}]$ is larger than 5 Hz and, typically, larger than 100 Hz.

The power of the low-frequency signal generated by the device 4 when it is used is sufficiently high to be capable of displacing a contact defect between its open and closed states. The low-frequency signal generated by the device 4 when it is used is a vibratory wave also called a "low-frequency elastic wave". It propagates parallel to the external face of the thin structure 6 and throughout the thin structure 6. It is reflected by discontinuities in the thin structure 6 and, in particular, by the edges of the thin structure 6.

Generally, the low-frequency signal generated by the device 4 during its normal use is a signal that is not generated deliberately. It is therefore noise. This noise may, but does not necessarily, have the characteristics of a diffuse field. The characteristics of the low-frequency signal cannot therefore be precisely controlled or regulated, contrary to the characteristics of a low-frequency signal generated by a low-frequency emitter dedicated to this function. It is for this reason that this low-frequency signal has not been used in known defect-detecting methods such as the one described in the article A1.

Because of a problem during the manufacture of the thin structure 6 or because of wear related to repeated usage of the device 4, a contact defect may appear in the thin structure 6. Such a contact defect is for example a crack. In the case of a component made of laminated composite materials, such a crack may appear inside one of the layers of materials of the component or be the result of a delamination between two layers stacked one on the other.

It is important to rapidly detect such a defect, notably with a view to triggering preventive-maintenance operations before the defect grows to a stage such as to make the device 4 unusable.

The apparatus 8 allows the appearance of a contact defect in the thin structure 6 to be detected at an early stage, i.e. long before this defect makes the device 4 unusable.

To do so, the apparatus 8 uses the vibro-acoustic modulation that appears in the presence of a defect, of a low-frequency signal and of a high-frequency signal. It comprises to this end:
a high-frequency emitter 20,
a sensor 22,
an electronic computer 24, and
a human-machine interface 26.

The emitter 20 is able to generate a high-frequency signal that propagates through the thin structure 6 parallel to its external face. To do so, the emitter 20 is fastened to the thin structure 6 with no degree of freedom in directions parallel to the external face of the thin structure 6. In addition, here, the emitter 20 is fastened to the thin structure 6 with no degree of freedom in a direction perpendicular to the external face. For example, the emitter 20 is adhesively bonded to the external or internal face of the thin structure 6. The emitter 20 may also be accommodated in a housing produced to this end in the thickness of the thin structure 6. In the latter case, the emitter 20 is located between the external and internal faces of the thin structure 6.

The emitter 20 is able to generate a high-frequency signal that has the characteristics described below. Here, the emitter 20 performs, inside the device 4 or system 2, no function other than the function consisting in generating this high-frequency signal.

The high-frequency signal generated by the emitter 20 is an elastic wave. In the case of a thin structure, preferably, the high-frequency signal is a Lamb wave. 95% of the power of the high-frequency signal is comprised in a frequency band $[f_{HFmin}; f_{HFmax}]$ when the high-frequency signal is emitted in the absence of a low-frequency signal. Thus, the power spectrum constructed from samples of a measurement of the vibrations of the thin structure 6, when the high-frequency signal is being emitted and when the device 4 is not being used, has a power lobe that represents 95% of the total power measured over the entire extent of the constructed power spectrum. This power lobe starts at the frequency $f_{HFmin}$ and ends at the frequency $f_{BFmax}$. This power spectrum is constructed by applying a Fourier transform directly to samples of the measurement of the vibrations, said samples being acquired at the constant sampling frequency $f_e$.

When the device 4 is not being used, the thin structure 6 is subjected to no vibrations other than the vibrations, if any, generated by the emitter 20.

The frequency $f_{HFmin}$ is two times higher than the frequency $f_{BFmax}$ and generally five or ten times higher than the frequency $f_{BFmax}$.

The frequency $f_{HFmax}$ is chosen so as to prevent defects that are too small in size from being detected. Specifically, the higher the frequency $f_{HFmax}$ the smaller the size of the defects detectable by the apparatus 8. However, it is desirable to not detect defects that are overly small, i.e. defects that present no risk to the operation of the device 4 and that must therefore not trigger any preventive-maintenance operation. Because of this, generally, the frequency $f_{HFmax}$ is lower than 5 MHz.

The frequencies $f_{HFmin}$ and $f_{HFmax}$ are located in the frequency band in which the attenuation per unit length of the Lamb waves in the thin structure 6 is low. Typically, the frequencies $f_{HFmin}$ and $f_{HFmax}$ are chosen so that the attenuation of the Lamb waves is low enough to allow the Lamb waves to propagate over a sufficient length before being overly attenuated. A "sufficient length" is a length that allows the Lamb waves to reach the defect to be detected. For example, a sufficient length is a length comprised between $0.1 \cdot L_{max}$ and $L_{max}$ or between $0.5 \cdot L_{max}$ and $L_{max}$, where $L_{max}$ is the largest distance that separates the emitter 20 from an edge of the thin structure 6. The expression "overly attenuated" means that the vibro-acoustic modulation generated by the interaction of the low-frequency signal and of the Lamb waves, at the furthest defect that the appliance 8 must allow to be detected, is not detectable, on the basis of the measurements of the sensor 22, because the power of the signal caused by the vibro-acoustic modulation is lower than or equal to the power of the measurement noise. The measurement noise is equal to the sum of the ambient noise in the thin structure 6 and of the electronic noise of the apparatus 8 and, notably, of the sensor 22. Thus, the choice of the frequencies $f_{HFmin}$ and $f_{HFmax}$ depends on the characteristics of the thin structure 6 and on the characteristics of the measurement noise. Typically, the frequencies $f_{HFmin}$ and $f_{HFmax}$ are therefore chosen by carrying out experiments or numerical simulations until acceptable values are found for the frequencies $f_{HFmin}$ and $f_{HFmax}$.

The frequencies $f_{HFmin}$ and $f_{HFmax}$ are also located inside the passband of the sensor 22, i.e. inside the frequency band in which vibrations are measurable by this sensor 22.

Lastly, the high-frequency signal is designed to produce, in combination with the low-frequency signal generated by the normal use of the device 4, a detectable vibro-acoustic modulation when the thin structure 6 comprises a contact defect, without placing any particular constraints on the low-frequency signal. Specifically, here, the characteristics of the low-frequency signal are set by the construction and normal use of the device 4. It has been established that, for simultaneous generation of high-frequency and low-frequency signals to produce a detectable vibro-acoustic modulation when a contact defect is present, the high-frequency signal generated by the emitter 20 must meet two conditions that are called condition (1) and condition (2) below, respectively.

Condition (1) is that the duration of the high-frequency signal must be higher than $1/f_{BFmin}$. Here, to meet this condition, the high-frequency signal is emitted throughout the duration $d_i$ of an interval $[t_i; t_{i+1}]$. Thus, the emission of the high-frequency signal starts at a time t and ends at a time $t_{i+1}$. The intervals of emission of the high-frequency may be repeated. Preferably, the duration $d_i$ is a plurality of times longer than $1/f_{BFmin}$. For example, the duration $d_i$ is ten or one-hundred times longer than $1/f_{BFmin}$. In this embodiment, the duration $d_i$ is chosen to be long enough for the high-frequency signal to have the time to be reflected by the edges of the thin structure 6 before returning to the sensor 22.

To save energy, the duration is also chosen to be quite short, i.e. typically shorter than 5 min or 1 min or 30 s.

Condition (2) is that there be a power spectrum of the vibratory signal measured by the sensor 22 in which:
- 95% of the power of the spectrum of the low-frequency signal is comprised in a frequency range [$u_{BFmin}$; $u_{BFmax}$] when the device 4 is used in the absence of a high-frequency signal generated by the apparatus 8, and
- 95% of the power of the high-frequency signal is comprised in a frequency range [$u_{HFmin}$; $u_{HFmax}$] when the high-frequency signal is emitted in the absence of the low-frequency signal, and
- the high-frequency signal is configured so that the width of the range [$u_{HFmin}$; $u_{HFmax}$] is systematically smaller than the frequency $u_{BFmin}$ in the same power spectrum.

Given that the low-frequency signal is generated by the use of the device 4, the width of the range [$u_{BFmin}$; $u_{BFmax}$] is systematically larger than 5 Hz or 100 Hz.

Actually, the reason why condition (2) allows vibro-acoustic modulations to be detected even though the characteristics of the low-frequency signal are not adjustable is the following: the vibro-acoustic modulation produced by a defect generates, in the power spectrum, additional power lobes. These additional power lobes are the result of the appearance of harmonics at frequencies equal to $f_{HFi}$+ n.$f_{BFm}$, where:
- $f_{HFi}$ is a frequency comprised in the range [$f_{HFmin}$; $f_{HFmax}$],
- $f_{BFm}$ is a frequency comprised in the range [$f_{BFmin}$; $f_{BFmax}$],
- n is a relative integer, i.e. an integer number that may be positive or negative, and
- the symbol "." designates the operation of multiplication.

The power of these harmonics is much lower than the power of the high-frequency signal. Thus, if such a harmonic appears inside the range [$u_{HFmin}$; $u_{HFmax}$], it cannot be distinguished from the high-frequency signal itself and is therefore not detectable. When condition (2) is met, this guarantees that these harmonics are systematically located outside of the range [$u_{HFmin}$; $u_{HFmax}$] and therefore that they are detectable. In addition, it is advantageous for the high-frequency signal to be configured so that the width of the range [$u_{HFmin}$; $u_{HFmax}$] is two, four or ten times smaller than the frequency $u_{BFmin}$.

The vibratory-signal power spectrum for which condition (2) is met is not necessarily the spectrum constructed by applying a Fourier transform directly to the samples of the vibratory signal acquired at the constant frequency $f_e$. On the contrary, as illustrated in the embodiment of FIG. 2, it may be a question of a power spectrum constructed from samples of the vibratory signal after it has undergone post-processing such as filtering, adaptive re-sampling, etc.

The frequency $f_{BFm}$ of the low-frequency signal and the frequency $f_{HFi}$ of the high-frequency signal that form a pair ($f_{BFm}$; $f_{HFi}$) of frequencies for which vibro-acoustic modulation occurs in the presence of a defect in the thin structure 6 are not here known in advance. For example, the frequency $f_{HFi}$ for which vibro-acoustic modulation occurs in the presence of a defect in the thin structure 6 varies depending on the characteristics of the thin structure, on the characteristics of the low-frequency signal and sometimes in addition depending on the characteristics of the defect to be detected. To mitigate this difficulty, in this first embodiment, the high-frequency signal scans a wide frequency band. To this end, the width of the range [$f_{HFmin}$; $f_{HFmax}$] is large, i.e. larger than 10 kHz and, preferably, larger than 20 kHz or than 50 kHz. Therefore, as a large range [$f_{HFmin}$; $f_{HFmax}$] is used, the probability of this range including at least one frequency $f_{HFi}$ increases. It is then possible to implement a detecting method using vibro-acoustic modulation without having, to do so, to determine beforehand precisely the one or more frequencies $f_{HFi}$ for which the vibro-acoustic modulation appears when a defect is present in the thin structure.

Here, to scan the band [$f_{HFmin}$; $f_{HFmax}$], the high-frequency signal emitted is a chirp. In this case, the frequency of the high-frequency signal is modulated so as to scan at least once all the frequencies of the band [$f_{HFmin}$; $f_{HFmax}$] every duration $d_i$ of the interval [$t_i$; $t_{i+1}$] and according to a predetermined law $L_{HF}$. The law $L_{HF}$ associates, with each time t comprised in the interval [$t_i$; $t_{i+1}$], one predetermined instantaneous frequency $f_{HF}(t)$ of the high-frequency signal. For example, in this first embodiment, the law $L_{HF}$ is a linear function that makes the instantaneous frequency $f_{HF}(t)$ of the high-frequency signal increase linearly, as a function of time t, starting from the frequency $f_{HFmin}$ at the time $t_i$ to the frequency $f_{HFmax}$ at the time $t_{i+1}$.

In this first embodiment, the instantaneous amplitude of the high-frequency signal remains constant and is not modulated. The law $L_{HF}$ is a law predetermined in advance and stored in the computer 24.

Thus, in this first embodiment, the high-frequency signal is entirely defined from the moment when the frequency $f_{HFmin}$, the duration $d_i$ and the law $L_{HF}$ are known.

The emitter 20 is capable of emitting the high-frequency signal described above. By way of illustration, the emitter 20 is a piezoelectric emitter controlled by the computer 24.

The sensor 22 is able to measure the vibratory signal and, in particular, harmonics resulting from the vibro-acoustic modulation when a defect is present in the thin structure. To this end, its passband encompasses the frequency band in which these harmonics are liable to appear. Here, to do so, the upper limit of its −3 dB passband is higher than $2f_{HFmax}$ or $3f_{HFmax}$.

The lower limit of its −3 dB passband is preferably lower than or equal to 20 kHz. Here, its lower limit is low enough that this same sensor 22 may be used to measure the low-frequency signal generated during use of the device 4. For example, this lower limit is lower than 100 Hz or than 10 Hz.

The sensor 22 is fastened to the thin structure with no degree of freedom in the directions parallel to the external face of the thin structure 6. The sensor 22 is for example fastened to the thin structure 6 as described in the case of the emitter 20.

In this embodiment, the apparatus 8 comprises a single sensor 22 for measuring the vibratory signal. This sensor 22 is for example a piezoelectric sensor.

The computer 24 is connected:
- to the emitter 20 with a view to commanding the emission of the high-frequency signal such as described above,
- to the sensor 22 with a view to acquiring the measurements of the vibratory signal at the sampling frequency $f_e$, and
- to the human-machine interface 26 with a view to signaling to a user whether or not there is a defect in the thin structure 6.

Figure 7:
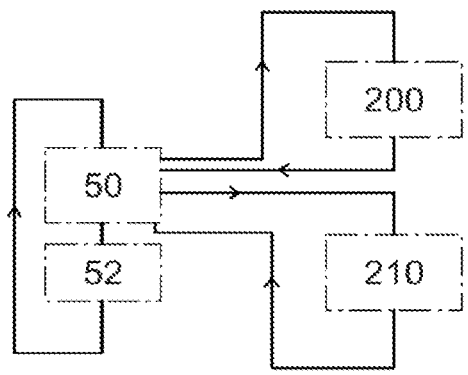
FIG. 7 is a flowchart of another method for detecting a defect capable of being implemented in the system of FIG. 2.

The computer 24 is configured to implement one of the detecting methods of FIGS. 2 and 7. To this end, it comprises a programmable microprocessor 30 and a memory 32 that contains the instructions and data required to implement the detecting method.

The human-machine interface 26 for example comprises a display or an indicator light that allows the presence of a defect in the thin structure 6 to be signaled to a human being when the computer 24 detects such a defect.

The computer 24 and the human-machine interface 26 have no need to be securely fastened directly to the thin structure 6. They are in contrast located remotely elsewhere in the airplane. In addition, the computer 24 and the human-machine interface 26 are not necessarily dedicated only to detection of a defect in the thin structure 6. Thus, they may also be used, in alternation, to perform other functions such as for example processing measurements originating from sensors other than the sensor 22.

The operation of the system 2 will now be described with reference to the method of FIG. 2 and with the aid of the graphs of FIGS. 3 to 6.

Figure 8:
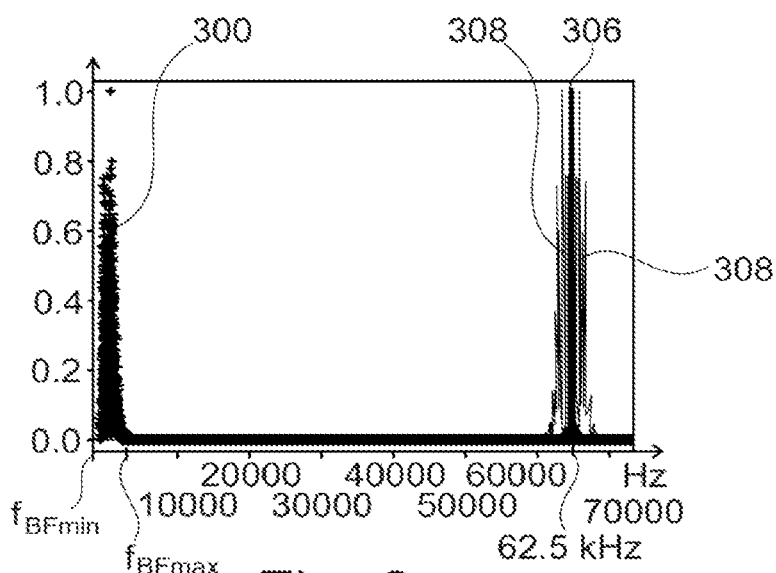
FIG. 8 is a graph illustrating the power spectra of various signals used during the implementation of the method of FIG. 7.

The graphs of FIGS. 3 to 6 and the graph of FIG. 8 show power spectra. In these graphs, the x-axes represent frequencies expressed in hertz and the y-axes represent the power of the signal at a corresponding frequency. The y-axes are expressed in an arbitrary unit dependent on the power of the signal and, for example, proportional to the power of this signal for this frequency.

The detecting method of FIG. 2 comprises a phase 50 of using the device 4 and, at least partially in parallel:
a calibrating phase 60, and
a phase 80 of detecting a defect.

The using phase 50 may be reiterated a number of times. In this case, between two successive iterations of the phase 50, the method comprises a resting phase 52 during which the device 4 is not used.

The phase 50 consists in using the device 4 normally. Here, during the phase 50, the turbine is driven to rotate by the engine 10 in order to propel the airplane along a path. For example, during the phase 50, the airplane is in flight. Throughout the phase 50, the use of the device 4 causes the low-frequency signal described above to be generated in the thin structure 6.

During the phase 52, the device 4 is not used and the generation of the low-frequency signal is therefore interrupted. For example, during the phase 52, the airplane is parked on a stand. The engine 10 is turned off and the turbine is not rotating.

Phases 60 and 80 are executed at least partially in parallel with the using phase 50. In contrast, although it is possible and even in certain cases advantageous, it is not necessary for phases 60 and 80 to both be carried out entirely in parallel with a using phase 50 or entirely in parallel with the same phase 50.

In the phase 60, the sensor 22 measures the vibratory signal and the computer 24 acquires, in a step 62, the measurements of the sensor 22 at the sampling frequency $f_e$. In step 62, the computer 24 inhibits the generation of the high-frequency signal. Thus, the vibratory signal measured by the sensor 22 in step 62 and acquired by the computer 24, corresponds only to the low-frequency signal.

Next, in a step 64, the computer 24 determines the value of the frequencies $f_{BFmin}$ and $f_{BFmax}$ that, in the power spectrum constructed directly from the samples taken at the frequency $f_e$, demarcate the frequency band $[f_{BFmin}; f_{BFmax}]$.

Next, in a step 66, the computer 24 uses the frequency $f_{BFmin}$ determined in step 64 to choose for the interval $[t_i; t_{i+1}]$ a duration $d_i$ that meets condition (1) defined above. Next, again in step 66, the computer 24 uses the frequency $f_{BFmax}$ determined in step 64 to choose a frequency $f_{HFmin}$ two times higher than the determined frequency $f_{BFmax}$. Thus, from this time, the waveform of the high-frequency signal to be generated is entirely defined since the law $L_{HF}$ was stored in the memory 32 beforehand.

It will be noted that the high-frequency signal thus defined also meets condition (2), notably because of the waveform imposed by the chosen law $L_{HF}$. Specifically, by carrying out adaptive re-sampling of the samples acquired at the constant frequency $f_e$, it is possible to obtain a new sampling of the vibratory signal in which the instantaneous sampling period $T_R(t)$ at time t no longer remains constant, but is rather dependent on the ratio $1/f_{HF}(t)$, where $f_{HF}(t)$ is the instantaneous frequency of the high-frequency signal at time t. Typically, the period $T_R(t)$ is proportional to $k/f_{HF}(t)$, where k is a constant natural integer. Adaptive re-sampling methods are known. Therefore, the adaptive re-sampling method employed here will not be described in detail. For example, the adaptive re-sampling method employed is the same as the one described in article A1.

In the power spectrum constructed by applying a Fourier transform to the samples of the new sampling obtained after the adaptive re-sampling, the width of the band $[u_{HFmin}; u_{HFmax}]$ is very small, i.e. smaller than 5 Hz. Thus, in the power spectrum constructed after adaptive re-sampling, the width of the band $[u_{HFmin}; u_{HFmax}]$ is systematically smaller than the frequency $u_{BFmin}$ that corresponds to the lower limit of the band $[u_{BFmin}; u_{BFmax}]$. This is illustrated below in FIGS. 4 to 6.

Once the waveform of the high-frequency signal has been defined so as to meet both conditions (1) and (2), the phase 80 of detecting a defect is executed. Phase 80 is at least partially executed in parallel with the phase 50.

After phase 50 has been in progress for several minutes, in a step 82, the computer 24 commands the emitter 20 to generate the high-frequency signal defined in phase 60 at the same time as the use of the device 4 generates the low-frequency signal.

In parallel, in a step 84, the sensor 22 measures the vibratory signal caused by the simultaneous propagation of the high-frequency signal and of the low-frequency signal through the thin structure 6. The computer 24 acquires, at the frequency $f_e$, samples of the measured vibratory signal throughout the duration of the interval $[t_i; t_{i+1}]$.

After the time $t_{i+1}$, in a step 86, the computer 24 detects, on the basis of the acquired measurements of the vibratory signal, the presence of a defect. To do so, the computer 24 detects the presence of at least one additional power lobe corresponding to the harmonics caused by the vibro-acoustic modulation should a defect be present.

Here, to do so, in an operation 88, the computer 24 first carries out adaptive re-sampling to obtain the new sampling in which the instantaneous sampling period $T_R(t)$ is proportional to $1/f_{HF}(t)$.

Next, in an operation 90, the computer 24 detects the presence of an additional power lobe in the power spectrum constructed by applying a Fourier transform directly to the samples of the new sampling. If such an additional power lobe exists, it is usually located to the right and to the left of a power peak centered on the average frequency $f_{HFm}$ of the high-frequency signal. In this embodiment, the frequency $f_{HFm}$ is equal to $(f_{HFmin}+f_{HFmax})/2$.

If an additional power lobe is detected in operation 90, then the computer 24 continues to a step 96. In step 96, it commands the human-machine interface 26 so as to signal the existence of a defect in the thin structure 6 to a user.

In the contrary case, if no additional power lobe is detected in operation 90, the computer 24 inhibits signaling of such a defect.

Phase 80 may be repeated several times during the using phase 50. For example, phase 80 is reiterated at regular intervals in order to frequently check the state of health of the thin structure 6. It is also possible to trigger execution of phase 80 in response to receipt, by the computer 24, of a command transmitted by a user.

The operation of the method of FIG. 2 is also illustrated by the graphs of FIGS. 3 to 6. The graphs of FIGS. 3 to 6 were obtained in the following particular case:
the frequencies $f_{HFmin}$ and $f_{BFmax}$ are equal to 500 Hz and to 2 kHz, respectively,
the frequencies $f_{HFmin}$ and $f_{HFmax}$ are equal to 25 kHz and to 100 kHz, respectively, and
the duration $d_i$ is equal to 1 second.

The graph of FIG. 3 shows:
the power spectrum 300 of the low-frequency signal,
the power spectrum 302 of the high-frequency signal, and
the power spectrum 304 of the vibratory signal measured by the sensor 22 in the presence of a contact defect in the thin structure 6.

These three power spectra are obtained by applying a Fourier transform directly to the samples acquired at the sampling frequency $f_e$ during the interval $[t_i; t_{i+1}]$. The spectrum 302 extends continuously from 25 kHz to 100 kHz. In this band from 25 kHz to 100 kHz, the spectrum 302 is practically constant except in proximity to the limits at 25 kHz and 100 kHz.

This graph shows that, in the power spectrum 304 of the vibratory signal measured by the sensor 22, the harmonics caused by vibro-acoustic modulations are located inside the band $[f_{HFmin}; f_{HFmax}]$ and cannot therefore be clearly distinguished from the power lobe corresponding to the high-frequency signal.

The graph of FIG. 4 shows the power spectrum of the vibratory signal obtained after adaptive re-sampling and in the absence of defect in the thin structure 6.

Figure 5:
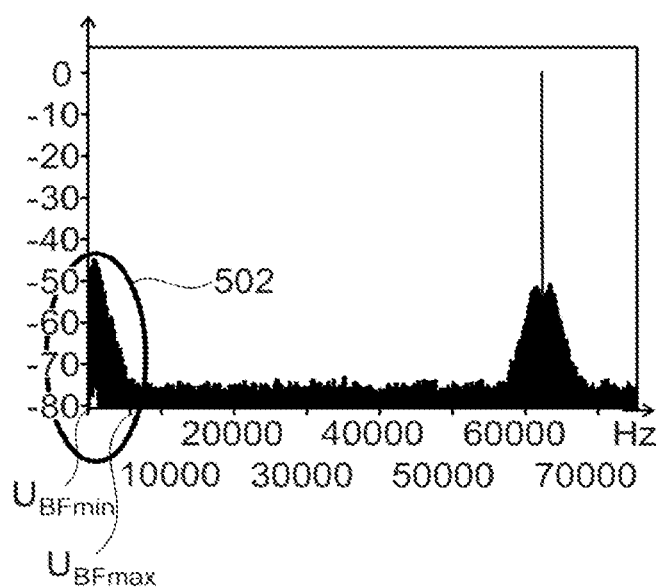
Figure 6:
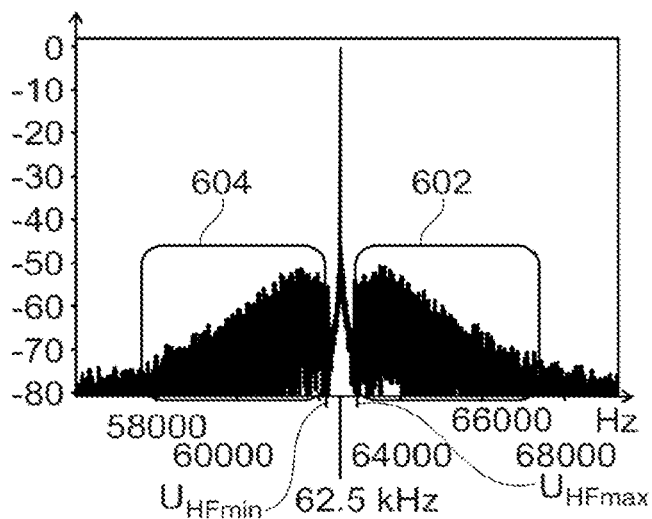

The graphs of FIGS. 5 to 6 show the power spectrum of the same vibratory signal as the one used to construct the spectrum 304 but obtained after adaptive re-sampling, i.e. after a Fourier transform has been applied to the samples obtained at the end of operation 88. The graphs of FIGS. 5 and 6 were obtained in the presence of a micro-crack in the thin structure 6 and more precisely in the presence of an onset of delamination between two layers of the panel.

The graph of FIG. 6 is an enlargement of the segment of the graph of FIG. 5 around the power peak corresponding to the high-frequency signal. In the graph of FIG. 6, the additional power lobes located to the right and to the left of the power peak corresponding to the high-frequency signal have been encircled by boxes, 602 and 604 respectively.

Comparing the power spectrum 304 with the spectrum of the graph of FIG. 4 shows that the adaptive re-sampling has the effect of compressing the power spectrum of the high-frequency signal about the average frequency $f_{HFm}$. Here, this frequency $f_{HFm}$ is equal to 62.5 MHz. Thus, in the power spectrum obtained after adaptive re-sampling, the width of the band $[u_{HFmin}; u_{HFmax}]$ is very small and smaller than the frequency $u_{BFmin}$. In FIGS. 4 and 5, the power lobe caused by the low-frequency signal has been encircled by an oval 502.

FIGS. 5 and 6 show that, in the power spectrum obtained after adaptive re-sampling, the additional power lobes caused by the vibro-acoustic modulation are clearly distinguishable from the power peak caused by the high-frequency signal located at 62.5 kHz. The computer 24 is thus able to easily detect the existence of these additional power lobes in the power spectrum of FIGS. 5 and 6.

FIG. 7 shows another method for detecting a defect capable of being implemented by the computer 24 instead of the method of FIG. 2. This method is identical to the method of FIG. 2 except that the calibrating phase 60 has been replaced by a calibrating phase 200 and the detecting phase 80 has been replaced by a detecting phase 210.

The phase 200 consists in identifying at least one frequency $f_{HFi}$ for which the vibro-acoustic modulation appears when a defect is present in the thin structure 6 and in the presence of the low-frequency signal generated by the use of the device 4. For example, the frequency $f_{HFi}$ is determined by experimentation or by digital simulation. Once the frequency $f_{HFi}$ has been identified, the latter is stored in the memory 32 of the computer 24. Notably in the case where the frequency $f_{HFi}$ is determined by digital simulation, it is not necessary for this phase 200 to be executed at least partially in parallel with a phase 50.

Phase 210 is identical to phase 80 except that:
in step 84, the high-frequency signal is a signal the frequency of which is constant throughout the duration $d_i$ and equal to the frequency $f_{HFi}$ identified in phase 200, and
the operation 88 of adaptively re-sampling is omitted and hence the operation 90 of detecting the additional power lobe is carried out directly, on the basis of the samples of the vibratory signal acquired at the sampling frequency $f_e$, and not on the basis of samples resulting from the operation 88 of adaptively re-sampling.

The graph of FIG. 8 shows:
the power spectrum 300 of the low-frequency signal,
the power spectrum 306 of the high-frequency signal, and
the power spectrum 308 of the vibratory signal measured by the sensor 22 in the presence of a defect.

The power spectra 300, 306 and 308 are obtained by applying a Fourier transform directly to the samples of the low-frequency signal, of the high-frequency signal and of the vibratory signal acquired at the sampling frequency $f_e$, respectively.

In the graph of FIG. 8, the spectrum 306 is a single line of very small width located at the frequency 62.5 kHz. Typically, the width of this line is smaller than 5 Hz so that condition (2) is systematically met. Thus, as illustrated in this graph, the additional power lobes caused by the vibro-acoustic modulation are located on either side of the power peak at 62.5 kHz corresponding to the high-frequency signal and may therefore be easily detected by the computer 24. In FIG. 8, to improve the readability of the graph, the height of the additional lobes has been made about equal to the height of the peak at 62.5 kHz. However, in fact, as indicated above, the height of the additional lobes is much smaller.

In the case of the method of FIG. 7, the ranges $[u_{BFmin}; u_{BFmax}]$ and $[u_{HFmin}; u_{HFmax}]$ are equal to the bands $[f_{BFmin}; f_{BFmax}]$ and $[f_{HFmin}; f_{HFmax}]$, respectively.

SECTION II—VARIANTS

Variants of the Structure:

The method described here is applicable to thin structures other than a fuselage panel of an airplane. For example, the thin structure in which a defect must be detected by implementing one of the methods described in Section I may be any part the width and the length of which is ten times or one-hundred times larger than its thickness. In the case of a non-rectangular part, the width and the length of this non-rectangular part are equal to the length and the width of the rectangle of smallest area that entirely contains the orthogonal projection of this non-rectangular part onto a plane, along a direction normal to the external face of this part. Thus, the thin structure may also be a plate, a rail, a tube, a bar or any other part the thickness of which is small with respect to its length or its width. In particular, for example in the case of a bar, the thin structure does not necessarily comprise both an external face and an internal face.

The thin structure may be made of materials other than a laminated composite material. For example, the thin structure may be made of a non-laminated or non-composite material. In this case, for example, the thin structure is a blade of a turbine or of a propeller or impeller. Thus, the methods described here are also applicable to thin structures made of metal or of concrete.

The defects detectable using the methods described here are not limited to cracks or micro-cracks. It may also be a question of defects such as traces of corrosion or of a local modification in the porosity of the thin structure.

The device equipped with the thin structure is not necessarily an airplane. For example, the device 4 may be any vehicle for transporting hardware or people. In this case, the use of the device consists in using the vehicle to transport the hardware or people along a path. Typically, such a vehicle is equipped with an engine able to propel it along this path when it is in operation. The low-frequency signal is then for example generated by the vibrations of this engine when it operates or by the turbulent flow of a fluid flowing over the thin structure as the vehicle moves. When the device is a vehicle, the thin structure is for example a part of the body of this vehicle or of the chassis of this vehicle or of an engine of this vehicle. The vehicle may be an aircraft, a motor vehicle, a rail vehicle, a maritime shipping vehicle, a rocket, etc.

The device may also be a duct for transporting a fluid. In this case, the use of the device consists in making the fluid to be transported flow, typically in turbulent regime, through the interior of the duct. In this case, the thin structure is typically the wall of the duct. The transported fluid may be a liquid or a gas.

The device may also be a construction over which is driven a vehicle for transporting hardware and/or people. In this case, the use of the device consists in making the transporting vehicle drive over this construction. The construction is for example a civil engineering work such as a bridge or a road over which the transporting vehicle may be driven. In this case, the thin structure is for example a rail over which a rail vehicle is driven.

As a variant, the structure is not a thin structure. In this case, the high-frequency signal is formed so that it propagates, without being overly attenuated, through the structure and, preferably, parallel to one face of this structure. For example, to do so, the Lamb wave is replaced by a Rayleigh wave that propagates parallel to one face of the structure.

Variants of the Detecting Apparatus:

Other technology sensors are usable to produce the sensor 22. For example, the sensor 22 may be produced using:
- an electromagnetic-acoustic transducer (EMAT),
- a film made up of polyvinylidene-fluoride (PVDF) materials, or
- an optical fiber in which a Bragg grating is produced.

Use of an EMAT in the context of detecting a defect in a thin metal structure is for example described in patent application FR3105554. An EMAT is advantageous in that the vibratory signal is measured without direct contact between the sensor and the external or internal face of the thin structure. In this case, the EMAT is fastened to the thin structure so as to have no degree of freedom in a direction parallel to the face of the thin structure to which it is fastened. In contrast, it may have a small degree of freedom in a direction perpendicular to this face.

The use of a Bragg grating by way of sensor of the vibratory signal is described in detail in patent application FR3014200.

In one simplified variant, the sensor 22 is only able to measure components of the vibratory signal the frequencies of which are higher than $f_{BFmax}$. In this case, the sensor cannot be used in the calibrating phase 60. Therefore, the calibrating phase 60 is carried out using another sensor capable of measuring the low-frequency signal. This other sensor may be fastened to the thin structure 6 only in the calibrating phase, then removed subsequently. Specifically, this other sensor is not required to implement the detecting phase 80 or the detecting phase 210.

The number of sensors used in the apparatus 8 to measure the vibratory signal may be higher than one. In the case where the number of sensors is higher than two, location of the defect detected in the thin structure is often in addition possible.

Other embodiments are possible for the emitter 20. For example, a piezoelectric sensor, an EMAT, or a PVDF film, may also be used to generate the high-frequency signal. In this case, the same sensor may in addition be used to generate the high-frequency signal and, in alternation, to measure the vibratory signal.

As a variant, the emitter 20 generates, by way of high-frequency signal, not a Lamb wave but another type of ultrasonic elastic waves such as a volume wave, a surface wave, a Rayleigh wave, etc. In the latter cases, it is not necessary for the structure 6 to be a thin structure.

The apparatus 8 may also comprise a plurality of specimens of the emitter 20 fastened to various locations on the thin structure.

As a variant, the human-machine interface 26 is removable. In this case, typically, during the use of the device 4, the interface 26 is not present. The interface 26 is connected to the computer 24 only during a preventive-maintenance operation, with a view to displaying the existence or non-existence of a defect.

Variants of the Method:

The calibrating phase may be omitted. In this case, for example, the frequency $f_{HFmin}$ and the duration $d_i$ are constants stored in the memory 32 beforehand. These constants will have been determined, beforehand, so that condition (1) is met, for example on the basis of numerical simulations and/or on the basis of measurements carried out on a prototype.

In the calibrating phase 60, the sampling frequency is not necessarily higher than twice the frequency $f_{HFmax}$.

Other methods for detecting additional power lobes in the power spectrum are possible. In particular, although it is a particularly advantageous embodiment, it is not necessary to perform adaptive re-sampling. For example, in a first variant, instead of sampling the measurement of the sensor 22 at the constant frequency $f_e$, the measurement of the sensor 22 is sampled directly with an irregular period equal to $T_R(t)$. In this case, for example, as indicated above, the calibrating phase is omitted. In another variant, the acquired measurements may be divided into short time windows. For example, to obtain a power spectrum in which the additional power lobes are clearly detached from the background noise and from the power peak of the high-frequency signal, a method using short-time Fourier transforms (STFTs) may also be implemented by way of alternative to an adaptive re-sampling method. Implementation of such short-time Fourier transforms to this end is for example described in detail in the article A1. There are yet other alternative methods to adaptive re-sampling. Such alternative methods are for example described in the following article: Zhipeng Feng et al., "Recent advances in time—frequency analysis methods for machinery fault diagnosis: A review with application examples", Mechanical Systems and Signal Processing, volume 38, issue 1, 5 Jul. 2013, pages 165-205.

The methods described above for obtaining a power spectrum in which the harmonics caused by the vibroacoustic modulation are detectable may be combined with other known methods to improve the signal-to-noise ratio and thus allow the additional power lobes to be isolated more easily. For example, it is possible to use to this end pulse-inversion or amplitude-modulation techniques. The reader may refer to the following article for a more detailed description of such techniques: SONG et al.: "Coded excitation for ultrasound tissue harmonic imaging", Ultrasonics 50, 2010, pages 613-619. It is also possible to decrease noise by implementing conventional filtering methods such as simply averaging a number of samples.

When the apparatus 8 comprises a plurality of sensors and typically at least three sensors distributed over the thin structure, it is possible not only to detect the presence of a defect but also to locate its location. To do so, for example, the described detecting methods are combined with a known method for locating a defect on the basis of the vibratory signals measured by each of the sensors. For example, the distance between a sensor and the detected defect is estimated on the basis of the propagation time of the vibratory signal to this sensor then, by triangulation, the location of the detected defect is estimated. A method based on this principle is for example described in patent application FR3014200. The defect-imaging method described in patent application FR3075373 may also be adapted to use the vibratory signals measured by each of the sensors of the apparatus 8 with a view to locating the detected defect.

In the case where the location of a defect must be estimated, preferably, the distance between the emitter 20 and each of the sensors will be larger than one wavelength $\lambda_{HFmin}$ of the high-frequency signal at the frequency $f_{HFmin}$. Typically, this distance is larger than 1 cm, 5 cm or 10 cm. In addition, preferably, the duration of emission of the high-frequency signal is chosen to be short enough that the emitted high-frequency signal is not reflected by discontinuities of the thin structure such as for example its edges.

Other forms of chirp are possible by way of high-frequency signal. For example, instead of a linear increase in the frequency, it may be a question of a linear decrease in the frequency. The linear increase in the instantaneous frequency over the duration $d_i$ may also be replaced by an exponential increase in the instantaneous frequency over this duration $d_i$. In these cases, the adaptive re-sampling method must be adapted to obtain a new sampling period $T_R(t)$ at the time t that remains an integer multiple of the period $1/f_{HF}(t)$. For example, the definition of such a signal for which the instantaneous frequency $f_{HF}(t)$ increases exponentially over the duration $d_i$ is described in the following article: GUIDORZI et al.: "Impulse responses measured with MLS or Swept-Sine signals applied to architectural acoustics: an in-depth analysis of the two methods and some case studies of measurements inside theaters", Energy Procedia 78, 2015, pages 1611-1616.

As a variant, in addition to modulating the frequency over the duration $d_i$, it is also possible to modulate the amplitude of the high-frequency signal according to a predetermined law $LA_{HF}$ that with each time t of the interval $[t_i; t_{i+1}]$ associates one non-zero instantaneous amplitude $A_{HF}(t)$ of the high-frequency signal.

As illustrated in the case of the embodiment of FIG. 7, as a variant, the high-frequency signal is not a chirp. For example, the high-frequency signal may also be a high-frequency signal corresponding to a power spectrum combining a plurality of single-frequency signals at distinct frequencies.

Detecting step 86 may be carried out at a moment when the device 4 is not being used. In this case, in phase 50, the measurements of the sensor 22 are stored in the memory 32 then these stored measurements are processed in parallel in phase 52.

SECTION III—ADVANTAGES OF THE DESCRIBED EMBODIMENTS

Condition (2) allows a low-frequency signal naturally generated during the use of the device to be used to detect defects, instead of using low-frequency signals generated by a low-frequency emitter dedicated to this usage. Thus, the various embodiments of the detecting method described here preserve the advantages of detecting methods using vibroacoustic modulation while in addition having the advantage that it is not necessary to install an additional low-frequency emitter in the device to implement this detecting method.

In addition, since the method described here exploits the low-frequency signal naturally generated during the use of the device, detection of defects is possible at the same time as this device is used. In contrast, in known detecting methods that exploit vibro-acoustic modulation, these methods must be implemented in the absence of the low-frequency signal naturally generated by the normal use of the device, this requiring the use of the device to be interrupted to detect a defect.

The fact that the width of the band $[f_{HFmin}; f_{HFmax}]$ is larger than 10 kHz and preferably larger than 50 kHz allows a high-frequency signal that scans a large frequency range each time it is emitted to be obtained. Under these conditions, it is not necessary to carry out a prior analysis to precisely determine the one or more high-frequency-signal frequencies $f_{HFi}$ for which a vibro-acoustic modulation appears in the presence of a defect. This therefore simplifies implementation of the detecting method. This also allows a higher number of different defects to be detected. Specifically, depending on the nature of the defect present, the high-frequency-signal frequency $f_{HFi}$ for which a vibroacoustic modulation appears is not necessarily always same. Thus, as a large frequency range is scanned, the high-frequency signal makes the method sensitive to defects of various natures.

Using a single sensor simplifies the implementation of the detecting method.

Implementing adaptive re-sampling allows the sensitivity of the detecting method to be increased.

The calibrating phase allows the frequency $f_{HFmin}$ and the duration $d_i$ of the high-frequency signal to be automatically adjusted. This therefore simplifies the implementation of the method and makes it possible to automatically adapt it to a higher number of different situations.

The use of a Lamb wave for the high-frequency signal allows the power consumption of the apparatus 8 to be decreased since the attenuation of Lamb waves in a thin structure is low.

The invention claimed is:

1. A method for detecting a defect in a structure of a device via vibro-acoustic modulation, comprising:
   generating a low-frequency signal having a frequency $f_{BF}$ that makes the structure vibrate, 95 percent of power of the low-frequency signal being comprised in a frequency range $[f_{BFmin}; f_{BFmax}]$ broader than 5 Hz, where the frequency $f_{BFmin}$ is higher than 5 Hz and the frequency $f_{BFmax}$ is lower than 20 kHz, at the same time as the low-frequency signal is present, generating, via a high-frequency emitter securely fastened to the structure, a high-frequency signal having a frequency $f_{HF}$ that propagates through a thickness of the structure and parallel to a face of the structure, 95 percent of power of the generated high-frequency signal being comprised in a frequency band $[f_{HFmin}; f_{HFmax}]$, where the frequency $f_{HFmin}$ is two times higher than the frequency $f_{BFmax}$ and a duration of the high-frequency signal is longer than $1/f_{BFmin}$, measuring, with a sensor, a vibratory signal caused by the generated low-frequency and high-frequency signals at the same time, a power spectrum of the vibratory signal comprising:

a first frequency range $[u_{BFmin}; u_{BFmax}]$ that demarcates a region that contains 95 percent of the power of the generated low-frequency signal in an absence of the high-frequency signal, the frequency $u_{BFmin}$ being higher than 5 Hz, a second frequency range $[u_{HFmin}; u_{HFmax}]$ that demarcates a region that contains 95 percent of the power of the generated high-frequency signal in an absence of the low-frequency signal, and only when the structure contains a defect, at least one additional power lobe located outside of the frequency ranges $[u_{BFmin}; u_{BFmax}]$ and $[u_{HFmin}; u_{HFmax}]$, then detecting, on a basis of the measurements of the vibratory signal, an existence of the additional lobe, then signaling that there is a defect in the structure if such an additional lobe is detected and, otherwise, not signaling that there is a defect in the structure, wherein:

the generation of the low-frequency signal comprises only using the device, the use of the device generating the low-frequency signal without requiring recourse to be made to a low-frequency emitter only used to generate the low-frequency signal, a width of the first frequency range $[u_{BFmin}; u_{BFmax}]$ is larger than 5 Hz, and a width of the second frequency range $[u_{HFmin}; u_{HFmax}]$ is systematically smaller than $u_{BFmin}$, the generation of the high-frequency signal comprises:

generating the high-frequency signal throughout an interval $[t_i; t_{i+1}]$, the generation of the high-frequency signal starting at the time $t_i$ and stopping at the time $t_{i+1}$, a duration of the interval $[t_i; t_{i+1}]$ being longer than $1/f_{BFmin}$, and, during the interval $[t_i; t_{i+1}]$, the frequency of the high-frequency signal is modulated to pass from the frequency $f_{HFmin}$ to the frequency $f_{HFmax}$ according to a predetermined variation law $L_{HF}$ that, with each time t located inside the interval $[t_i; t_{i+1}]$, associates one predetermined instantaneous frequency $f_{HF}(t)$ of the high-frequency signal, the detection of the existence of the additional lobe comprises:

an operation of adaptively re-sampling the measurements of the sensor to obtain a new sampling of the measurements of the sensor in which an instantaneous sampling period at each time t of the interval $[t_i; t_{i+1}]$ is an integer multiple of $1/f_{HF}(t)$, the power spectrum of the obtained new sampling comprising the first frequency range $[u_{BFmin}; u_{BFmax}]$, the second frequency range $[u_{HFmin}; u_{HFmax}]$ and, only when the structure contains a defect, at least one additional power lobe located outside of the first frequency range $[u_{BFmin}; u_{BFmax}]$ and outside of the second frequency range $[u_{HFmin}; u_{HFmax}]$, then detecting the additional lobe in the power spectrum of the obtained new sampling.

2. The method as claimed in claim 1, wherein the width of the frequency band $[f_{HFmin}; f_{HFmax}]$ is larger than 10 kHz and, preferably, larger than 50 KHz.

3. The method as claimed in claim 1, wherein a single sensor is used to measure the vibratory signal.

4. The method as claimed in claim 1, wherein the law $L_{HF}$ is a linear function or an exponential function of time.

5. The method as claimed in claim 1, wherein the method comprises a calibrating phase that comprises:

stopping the generation of the high-frequency signal and, in parallel, measuring, via the sensor, the vibratory signal caused by the low-frequency signal alone, then determining, on a basis of the vibratory signal caused by the low-frequency signal alone, the frequency $f_{BFmin}$, then adjusting the high-frequency emitter so that the generation of the high-frequency signal lasts for a duration longer than $1/f_{BFmin}$.

6. The method as claimed in claim 1, wherein the generated high-frequency signal is a Lamb wave or a Rayleigh wave.

7. The method as claimed in claim 1, wherein the method comprises:

measuring, with a plurality of sensors securely fastened to the structure and placed in various locations on the structure, the vibratory signal caused by the generated low-frequency and high-frequency signals at the same time, and detecting the defect and estimating its position in the structure on the basis of the measurements of the vibratory signal carried out by the plurality of sensors.

8. The method as claimed in claim 1, wherein the use of the device that generates the low-frequency signal is chosen from the group consisting of the following uses:

in a case where the device is a vehicle for transporting an item of hardware or a person, the use of the device consists in transporting the item of hardware or the person along a path using the vehicle, in a case where the device is a duct for transporting fluid, the use of the device consists in making the fluid to be transported flow, in turbulent regime, through an interior of the duct, in a case where the device is a construction over which a vehicle for transporting an item of hardware or a person is driven, the use of the device consists in making this transporting vehicle drive over the construction, and in a case where the device is an impeller or propeller, the use of the device consists in driving the impeller or propeller to rotate to move a mass of fluid.

9. The method as claimed in claim 1, wherein the generation of the low-frequency signal comprises generating the low-frequency signal with a sufficient power to periodically deform the defect between a closed state and an open state at a frequency comprised in the band $[f_{BFmin}; f_{BFmax}]$.

10. A system comprising a device equipped with a structure, the system being configured to generate a low-frequency signal having a frequency $f_{BF}$ that makes the structure vibrate, 95 percent of the power of the low-frequency signal being comprised in a frequency range $[f_{BFmin}; f_{BFmax}]$ broader than 5 Hz, where the frequency $f_{BFmin}$ is higher than 5 Hz and the frequency $f_{BFmax}$ is lower than 20 kHz, the system also comprising an apparatus for detecting a defect in the structure via vibro-acoustic modulation, the apparatus comprising:
  a high-frequency emitter securely fastened to the structure, the high-frequency emitter being configured to generate, at the same time as the low-frequency signal is present, a high-frequency signal having a frequency $f_{HF}$ that propagates through a thickness of the structure and parallel to a face of the structure, 95 percent of power of the generated high-frequency signal being comprised in a frequency band $[f_{HFmin}; f_{HFmax}]$, where the frequency $f_{HFmin}$ is two times higher than the frequency $f_{BFmax}$ and a duration of the high-frequency signal being longer than $1/f_{BFmin}$,
  a sensor that is securely fastened to the structure, the sensor being configured to measure a vibratory signal caused by the generated low-frequency and high-frequency signals at the same time,
  a computer configured to:
  detect, on a basis of the measurements of the vibratory signal, existence of an additional power lobe in a power spectrum of the measured vibratory signal, which comprises:
    a first frequency range $[u_{BFmin}; u_{BFmax}]$ that demarcates a region that contains 95 percent of the power of the generated low-frequency signal in an absence of the high-frequency signal, the frequency $u_{BFmin}$ being higher than 5 Hz,
    a second frequency range $[u_{HFmin}; u_{HFmax}]$ that demarcates a region that contains 95 percent of the power of the generated high-frequency signal in an absence of the low-frequency signal, and
    only when the structure contains a defect, at least one additional power lobe located outside of the frequency ranges $[u_{BFmin}; u_{BFmax}]$ and $[u_{HFmin}; u_{HFmax}]$,
  signal that there is a defect in the structure if such an additional power lobe is detected and, otherwise, inhibit signaling of a defect in the structure,
wherein:
  the system is configured to generate the low-frequency signal without requiring recourse to be made to a low-frequency emitter only used to generate the low-frequency signal,
  the system is configured to generate the low-frequency signal for which a width of the first frequency range $[u_{BFmin}; u_{BFmax}]$ is larger than 5 Hz, and
  the high-frequency emitter is configured to generate the high-frequency signal for which a width of the second frequency range $[u_{HFmin}; u_{HFmax}]$ is systematically smaller than $u_{BFmin}$,
  the high-frequency emitter is configured to:
  generate the high-frequency signal throughout an interval $[t_i; t_{i+1}]$, the generation of the high-frequency signal starting at the time $t_i$ and stopping at the time $t_{i+1}$, the duration of the interval $[t_i; t_{i+1}]$ being longer than $1/f_{BFmin}$, and
  during the interval $[t_i; t_{i+1}]$, modulate the frequency of the high-frequency signal to pass from the frequency $f_{HFmin}$ to the frequency $f_{HFmax}$ according to a predetermined variation law $L_{HF}$ that, with each time t located inside the interval $[t_i; t_{i+1}]$, associates one predetermined instantaneous frequency $f_{HF}(t)$ of the high-frequency signal,
  the computer is further configured to detect the existence of the additional power lobe by executing the following operations:
  an operation of adaptively re-sampling the measurements of the sensor to obtain a new sampling of the measurements of the sensor in which an instantaneous sampling period at each time t of the interval $[t_i; t_{i+1}]$ is an integer multiple of $1/f_{HF}(t)$, the power spectrum of the obtained new sampling comprising the first frequency range $[u_{BFmin}; u_{BFmax}]$, the second frequency range $[u_{HFmin}; u_{HFmax}]$ and, only when the structure contains a defect, at least one additional power lobe located outside of the first frequency range $[u_{BFmin}; u_{BFmax}]$ and outside of the second frequency range $[u_{HFmin}; u_{HFmax}]$, then
  detecting the additional power lobe in the power spectrum of the obtained new sampling.

11. The system as claimed in claim 10, wherein the device is chosen from the group consisting of a vehicle for transporting an item of hardware or a person, a duct, a construction over which is driven a vehicle for transporting an item of hardware or a person and a propeller or impeller.

12. The system as claimed in claim 10, wherein:
  the apparatus for detecting a defect comprises a plurality of sensors securely fastened to the structure and placed in various locations on the structure, each of the sensors being configured to measure a vibratory signal caused by the generated low-frequency and high-frequency signals at the same time, and
  the computer is further configured to detect the defect and to estimate its position in the structure on the basis of the measurements of the vibratory signals carried out by the plurality of sensors.

* * * * *